Patented Nov. 19, 1929

1,736,015

UNITED STATES PATENT OFFICE

HERMANN PLAUSON, OF HAMBURG, GERMANY

MANUFACTURE OF SULFUR DYESTUFFS

No Drawing. Original application filed June 28, 1924, Serial No. 722,954, and in Germany July 2, 1923. Divided and this application filed January 13, 1927. Serial No. 161,019.

This invention relates to the manufacture of dark or black dyes containing sulfur and is a divisional application on my copending application Serial No. 722,954, filed June 28, 1924.

One of the objects of the invention is the production of a dye direct from a carbonaceous material by the action of sulfur in conjunction with a substance of an alkaline nature or having an alkaline reaction. Other objects of the invention are the production of black brownish-black or brownish-yellow sulfur dyes directly from such raw materials as bitumen, pitches, soots, peat and the like and also earthy coals, lignite, cannel coal, pitch coal, anthracite and lampblack. The raw materials are subjected to a sulfurizing process by heating with sulfur and a substance of an alkaline nature or having an alkaline reaction such as sodium sulfid, sodium hydrate, sodium carbonate, or the like. According to one feature of the invention the carbonaceous material is heated with sulfur together with the alkali substance but the material may also first be fused with sulfur and afterwards treated with the alkali substance. The material may also be heated with a preformed polysulfid melt.

The raw material may be subjected to a pre-treatment as described hereafter. Other features of the invention will be apparent from the following description and examples.

In the following process the entire coal is preferably converted into a finely dispersed state. The process depends upon the phenomenon that powdered materials of the kind referred to such as lignite or pitch coal by melting in an admixture with sulfur alone or with polysulfides give a colloidal product like a sulfur dye and the process is illustrated by the folowing examples.

Example 1

In a direct heated kettle which is best formed of Spencer metal 1000 grams of sodium sulfid 400 grams of sulfur and 500 grams of finely powdered lignite from the Wittenberg region (factory refuse) are thoroughly mixed and slowly heated. The reaction begins at about 110° C. According to the temperature at which the process is worked, dyestuffs are obtained of different tints. If the reaction is allowed to go for example at 200° C. there is formed a dye stuff which gives cotton a light brown tone. A dark brown black is obtained if the temperature rises to 300°. If a final temperature of 300° to 310° is employed there results on cooling a dry crumbly black powder which gives with water a colloidal dye bath with which cotton can be directly dyed black. The purification of the dye stuff is possible by the known methods of precipitating with acids or salts, etc., but is not however, necessary. In the dyeing process Turkey red oil can be added by which means a warm brown or black is produced.

Example 2

1000 parts of sodium sulfid and 600 parts of sulfur are moulded together at 100° to 110° C. then 500 grams of lignite are added slowly a little at a time thereto, and heated with stirring to 300 to 310° C. There is thereby obtained an ash grey crumbly mass which is soluble after grinding.

Example 3

A black dye for the oil and printing trade can be obtained without the application of sodium sulfid by the following method. 500 parts of powdered lignite are stirred up with 500 parts of concentrated sulfuric acid. To this are added 750 parts of sulfur, and the mass then heated in the absence of air to 130 to 150°. There is formed thereby a dry mass with the evolution of sulfur dioxid which when cold can be well produced. By wasing with boiling weakly alkaline water, a good black dye is obtained which can be used as a substitute for the finest lamp black. If sodium sulfid is added to the substances, the mass can be converted to the soluble state by further heating at 300°. Instead of lignite all kinds of cannel coal or similar pitch coal can be employed.

Example 4

Production of color lakes. 1000 parts of sodium sulfid, 400 parts of sulfur and 500 parts of powdered lignite are treated according to Example 1. The aqueous solution of this dye stuff is mixed with 5000 parts of ordinary clay. By heating, the clay is precipitated according to the known method, treated with a 1% solution of bichromate or other metal salts or tannin, neutralized, washed and dried. There is obtained in this way an extremely finely powdered black dye which finds application in the textile industry or as a filling material for plastic masses, for staining, or the manufacture of boot polish. Instead of clay other neutral earths such as ochre can be used. They must, however, always be present in a highly dispersed state or must be converted by the known method into the colloidal form for their application.

Example 5

100 parts of crude bitumen from lignite are reacted upon by 240 parts of sodium sulfid and 100 parts of sulfur according to Example 1. After heating for 3 to 5 hours at 200 to 250° the mass is allowed to cool and dried preferably under vacuum. A dark brown dye stuff results. If the bitumen is treated with concentrated or preferably with fuming sulfuric acid and afterwards the sulfonated product treated by the before described polysulfid melt, a deep black dye stuff is obtained.

Useful results may be obtained by pretreatment with sulfur chlorid. If the bitumen is treated with a sulfuric acid saltpeter mixture, a brown-black tone is produced, whereas by previous treatment with chlorine a dark green results. Instead of bitumen, lignite or pitch coal of all kinds can be treated by a sulfonation, nitration or chlorination process. The relative amount of resulting product and the operating temperature can be altered according to the shade desired. For the purpose of producing different tints a small addition of compounds of an organic or inorganic nature can be made, for example, the phenols and their derivatives, aniline or its derivatives, or homologues, benzidine, chlor-di-nitro-benzene, naphthalene, indophenol, urea etc.

Example 6

100 grams of sodium sulfid, 400 grams of sulfur and 500 grams of English anthracite finely powdered are well mixed in a kettle and heated slowly, with stirring to 300° to 350° C. After cooling there results a black powder which gives a colloidal solution in water and possesses the property of dyeing cotton or artificial silk a beautiful brown black. As starting product, German or other anthracite may be employed. If the amount of sulfur and sodium sulfid in the melt and the time of heating be increased, a substantially black dye is produced. Similar products are also obtained if an addition of copper salts or chromium compounds to a small amount was made to the melt.

The proportionual amounts of sodium sulfid sulfur and coal can be altered according to the desired dyeing effect. The process can naturally be carried out according to the previous examples.

Example 7

1250 parts of sodium sulfid, 500 parts of sulfur, 500 parts of charcoal dust are treated according to example 1 at a temperature of 300° to 350° C. If on account of overheating a modification insoluble in water is produced, this is converted into the soluble state by the addition of sodium sulfid.

Example 8

500 parts of lamp black, 1250 parts of sodium sulfid, and 500 parts of sulfur are treated as in Examples 7 or 8, at a temperature of 300° to 400° C. or at most 450°. A substantially bitumen-free lamp black gives a black colloid. The pure lamp black may be mixed with 3 to 10 parts or more of the bituminous extraction production of anthracite, pitch coal or such like charcoal or pitch products, and if these mixtures are acted upon by the polysulfid melt, a fast dye results.

In the preceding examples sodium sulfid has always been employed. Now it has been found that the sodium sulfid is not absolutely necessary, but can be replaced by other alkalis, e. g. caustic alkali or alkali metal carbonate. This way of proceeding is not obvious since sodium hydrate and especially sodium carbonate only react very slowly with sulfur and it was not known that coal is altered by such a mixture. Experiment has shown that a sulfur melt by the action of sodium hydroxide or carbonate furnishes directly a dyestuff. If a good result is required it is advantageous to increase the sulfur content above that indicated in the previous examples.

Example 9

800 grams NaOH, 800 grams sulfur and 400 grams lignite are melted together and heated with stirring to between 300–350°. After being allowed to cool the mass is powdered as finely as possibile in a ball mill or similar device. A 5% solution of this dye gives at this stage and without further addition, a beautiful deep brown black dyeing.

The proportionate amount of sodium hydate and sulfur can be altered in both directions according to the shade of dye desired. Instead of sodium hydroxide other alkali metal hydroxides can be employed. Obviously the melt can be carried through by the other methods of working shown in the previous examples.

The same result is reached if instead of lignite, cannel coal, turbanite or other bituminous coal is employed. A good black dye is obtained which easily dyes cotton and artificial silk.

Example 10

500 grams of finely pulverized English anthracite, 820 grams sulfur and 1000 grams of caustic soda are subjected to a melt as in Example 1 at a temperature of 300–350°. After cooling and powdering, a dark brown dyestuff is obtained. When heated for a longer time to 350–470° the product takes on a dark black tone. The solubility in this case is further improved by further addition of alkali metal sulfid. The dyeing can be carried out according to Example 10 with or without addition of fixing materials or of dye improvers.

Example 11

1000 parts of caustic soda, 850 parts of sulfur and 500 parts of charcoal or pitch coal, produced at the lowest possible temperature, are formed into a melt and then slowly heated from 350–450°. The mass can, after cooling, be ground to a fine powder which on the addition of sodium sulfid can be completely brought into solution. In a similar manner different lamp blacks can also be used for the production of dyestuffs.

Example 12

106 parts of calcined soda, 80 parts of sulfur and 40 to 50 parts of lignite are heated under continual stirring to 300–350°. The reaction goes slowly and almost imperceptibly and finally a yellow vapour is evolved and the usual deflagration takes place as is frequently to be observed in the production of sulfur dyes. A deep black powder is formed whose solution gives cotton or artificial silk a warm dark brown tone. By longer melting at the above mentioned temperature or by the addition of small amounts of inorganic or organic compounds as toning agents to the melt or to the dyebath, a black dye shade can be obtained. Instead of calcined soda, crystallized sodium carbonate in a corresponding amount can be used. Other carbonates are also applicable; the best result is given, however, by sodium carbonate.

All the other examples may be carried out with alkali metal carbonate instead of hydroxide, if mineral coals are used as starting materials. In the using of crystalline soda it has shown itself to be profitable to carry out the melt in an autoclave, for instance, under pressure; there is obtained in this way a particularly homogeneous end product. Naturally the process can take place with reflux condensation of the water of crystallization.

It has also been found that it is possible to simplify the production of sulfur dyestuffs from mineral coal or the like carbonaceous material if the sulfur-alkali, melt is not applied directly to the mixed constituents, but coal and sulfur are first heated together and then directly, after or before cooling and powdering, the product of the melt is subjected to the action of a further melting with the addition of the necessary amount of caustic alkali or alkali metal sulfid. The dyestuffs obtained in this way gives a considerably deeper black, and the action of the alkali melt is more complete and simple as the frothing and similar undesirable phenomena are eliminated from the process.

Example 13

400 grams of lignite or the like bituminous coal is heated with 800 grams sulfur to 120–150° C., preferably in the absence of air for 10 to 30 minutes. After this time the melt can be cooled and then pulverized or directly treated further by heating with 800–1000 grams caustic soda, preferably in absence of air to 300–400° C. until a homogeneous melt results. There is obtained a very good dye of deep black tone. Instead of caustic alkali a suitable amount of alkali metal sulfid such as sodium sulfid, can be taken. In the latter case the melting process can be carried out at 250°–300° C. in an autoclave under pressure preferably obtained by the use of a neutral gas. By the employment of alkali metal sulfid containing water of crystallization, the melt can be undertaken also under a reflux condenser. The processes of the preceding examples can be carried out in a similar manner.

It has further been observed that it is advantageous in the melting with sulfur to add compounds of copper, iron, zinc, nickel, cobalt, tin or chromium, or the metals themselves in the powder form in amounts of 1–5% as thereby the dyes possess an especially full tone. In similar manner small amounts of organic compounds suitable for altering the shades of the dyes can be added and the melting process undertaken.

All the dyes made according to the process of the preceding examples give brown to black dyeings on mercerized cotton or on artificial silk; on crude and non-mercerized cotton a brown-black tone can at best be produced or a very high concentration of the dyebath, or long boiling, etc., must be employed.

It has also been found that dyes which produce a deep black on different materials can be obtained, if the impure constituents are removed from the crude coal before the polysulfid melt in the dye synthesis. With this object the coal is treated in a pressure autoclave or in a colloid mill or similarly acting apparatus with alkali and water and freed by filtering or settling from the valueless materials. The suspended material is then precipitated with a weak gaseous acid such as carbon dioxid, sulfur dioxid, or by a dilute acid such as hydrochloric, sulfuric, nitric acid or the like. There is obtained in this manner as starting material for the dye manufacture a purified and more or less opened up preparation.

This product is dried and can be used directly for the production of sulfur dyestuffs according to the processes of the previous examples. In certain cases it can be subjected with advantage, even in the moist state to a process of sulfonation, oxidation, chlorination, nitration, azotization or reduction according to the tint desired, or even to several of the above substitution processes in any suitable order. The product obtained by extracting coal such as crude bitumen, pitch bitumen and the like with organic solvents, can be treated in similar manner. The characteristic feature of this part of the process consists in the fact that the starting materials for the manufacture of the dyestuff, obtained by the above described method of purification or extraction are always produced without the application of dry distillation. Only these give, in fact the desired deep black dyes as resulting products while those obtained through the distillation of carbonaceous materials are of no value as they almost always suffer deep seated changes.

If the product obtained from coal by the above method is subjected to the polysulfid melt, a deep black dyestuff is obtained which is absorbed by cotton much better than the substance produced by the direct process from coal.

Example 14

100 parts of lignite (ash content 16%) are mixed with 100 parts of alkali and 500 parts of water and heated in an autoclave for 1 to 2 hours. After dilution with 2000 parts of water it is allowed to settle and purified from the insoluble part by filtration or by slight centrifuging. The colloidal bituminous solution is rendered slightly acid with a weakly dissociated acid or with a dilute solution of a strong acid, by which means the suspended product is precipitated. After settling the surplus water is removed by further centrifuging or filtration, the residue freed from soluble salt by washing with water and then dried or subjected in the known way to a sulfonation, nitration, chlorination, azotization or a reduction process. The dry product obtained from this process or from the known chemical operations is converted into a sulfur dyestuff in the manner described in the previous examples. Black dies are obtained by the chlorination or sulfonation or the like, according to the manner of the substituents introduced, of different shades.

The material may be previously purified or separated into component by any method, for example by treatment in a high speed mechanical disintegrator such as a colloid mill. The coal may be previously heated either alone or with any known chemical or it may be partially distilled.

Example 15

If the bitumen has been obtained according to a known process by extraction with hydrocarbons, the residue is worked as in Example 14. The product obtained by this opening up process is added to the bitumen obtained from the extraction process before the further treatment by the known process by extraction with hydrocarbons, the residue is worked as in Example 14. The product obtained by this opening up process is added to the bitumen obtained from the extraction process before the further treatment by the melting process or by a solution process.

The working of the product obtained from Examples 14 or 15, can always be carried out in two ways. Either it can be subjected directly to a polysulfid melt or first by a known method to sulfonation, chlorination, nitration, or other conversion processes customary in the production of organic dyes, such as nitrification (azotierung) condensation and the like, and these products can then be converted by a melt with alkali and sulfur to the dyestuff. The result in both cases is a dyestuff which produces on the material a black-green tone, whereby if necessary, the chlorination or nitration or the like which has been accomplished makes a noticeable difference in the shade of the pure product, which can also be influenced in this way if desired.

For the improvement of the tint of the dye taken up, small amounts of organic compounds can be employed which give dyes in the polysulfid melt which are suitable for altering as desired, the shade of the final product towards green-black or blue-black. Naturally the choice of these will be governed by all previously gathered experience on the action of the order of substitution on the shade. Such compounds, for example, as para-nitroso-phenol and para-amide-phenol, paradihydroxybenzene, and moreover dinitraniline, dinitrophenol and the like are suitable. For obtaining bluer tints, naphthalene derivatives, for example, substituted in the peri-position are employed with success. Halogen-indophenols alter the shade towards the green indophenols chlorinated in the nucleus towards the green-blue and unchlorinated indophenols towards the pure blue.

In the appended claims by semicarbonized carbonaceous material, I mean material which by a natural process or by a heat treatment has been decomposed to yield a residue consisting of carbon more or less loosely chemically bound with other substances and which may be a solid or liquid or semi-liquid mass.

The term coal substance comprises all coals, lignite and solid or semi-liquid carbonaceous products derived therefrom.

I declare that what I claim is:—

1. Process for the production of a dye in which a semi-carbonized carbonaceous material is pretreated with a mineral acid and is then heated with a sulfur and afterwards with an inorganic alkaline substance.

2. Process for the production of a dye in which a coal substance is pretreated with a mineral acid and then is heated with sulfur, and afterwards with an inorganic alkaline substance.

3. Process for the production of a dye in which lignite is pretreated with a mineral acid and then is heated with sulfur, and afterwards with an inorganic alkaline substance.

4. Proces for the production of a dye in which a semi-carbonized carbonaceous material is pretreated with strong sulfuric acid, and is then heated with sulfur and with an inorganic alkaline substance.

5. Process for the production of dyes in which a semi-carbonized carbonaceous material is pretreated with a mineral acid and then is heated with sulfur, with an inorganic alkaline substance and with water under pressure.

In witness whereof, I have hereunto signed my name this 3rd day of January, 1927.

HERMANN PLAUSON.